Feb. 25, 1930.  R. C. ZUCKERMAN  1,748,746
BEET HARVESTER
Filed Dec. 14, 1929   3 Sheets-Sheet 1
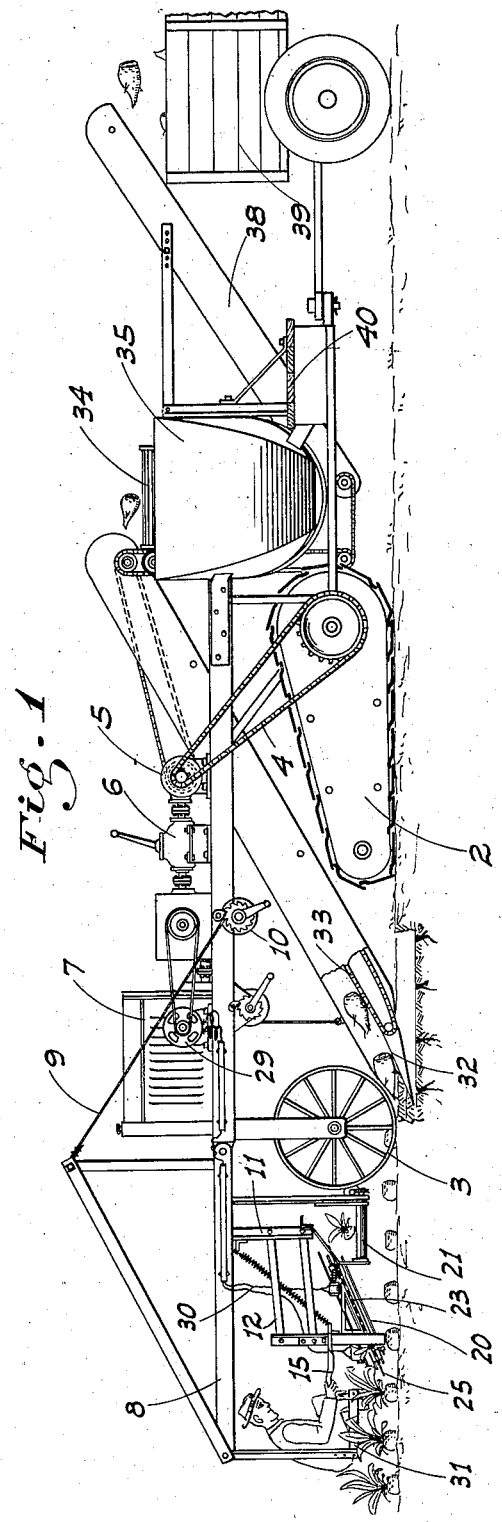
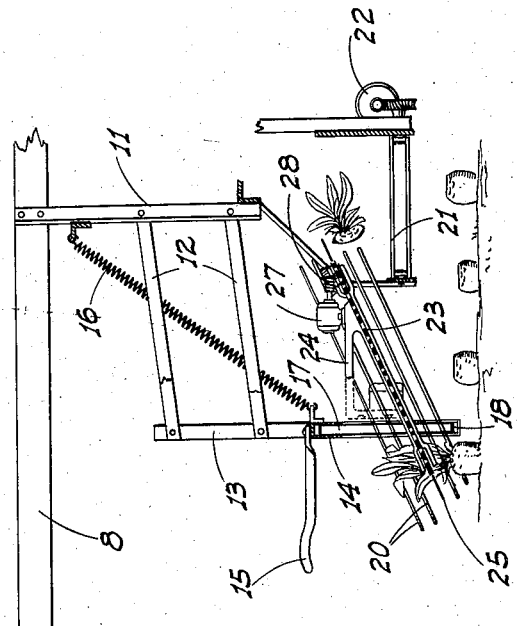
INVENTOR
R. C. Zuckerman
BY
ATTORNEY

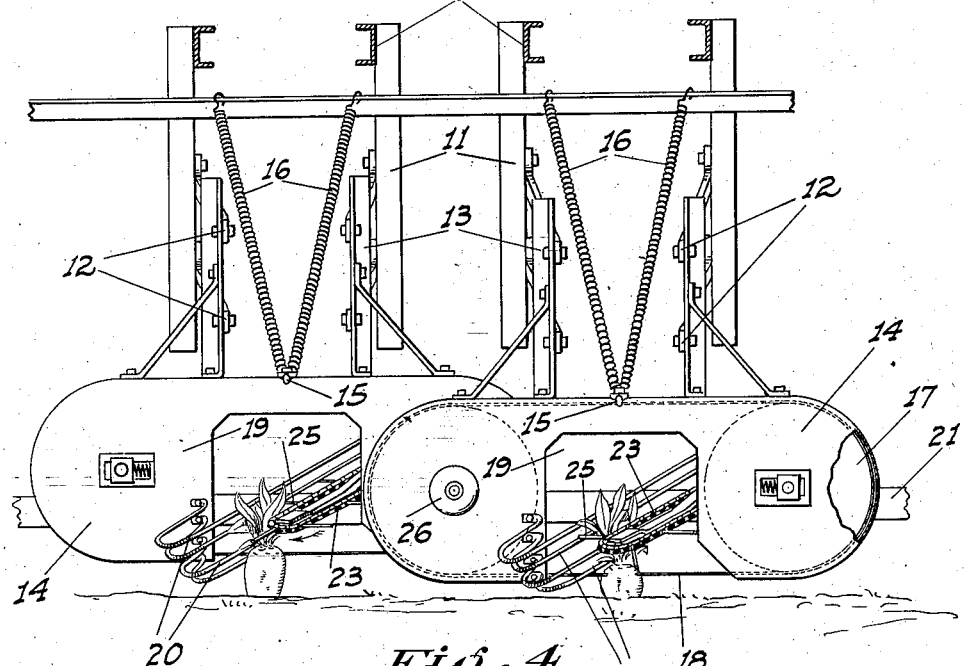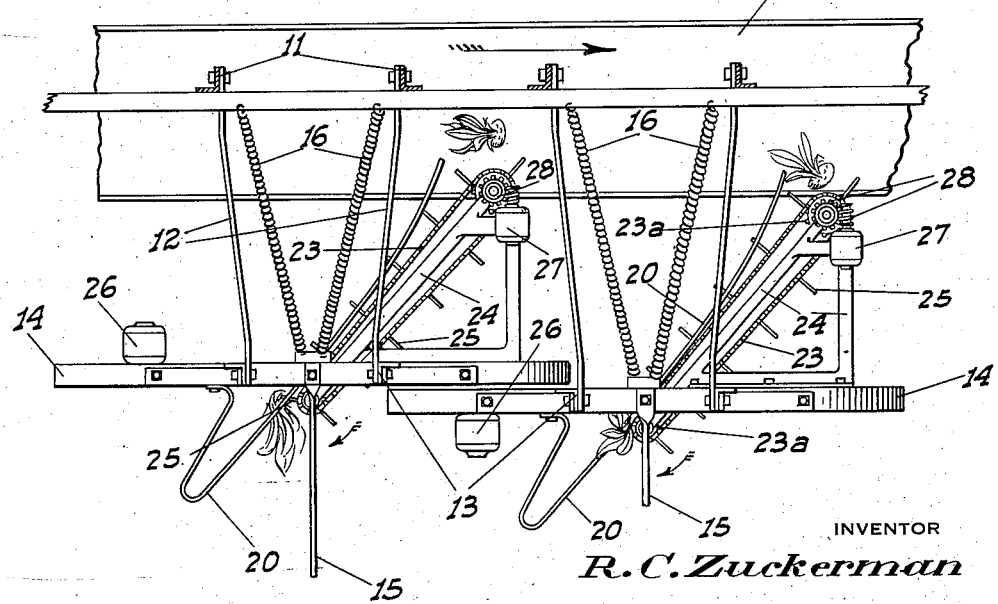

Feb. 25, 1930.  R. C. ZUCKERMAN  1,748,746
BEET HARVESTER
Filed Dec. 14, 1929   3 Sheets-Sheet 3
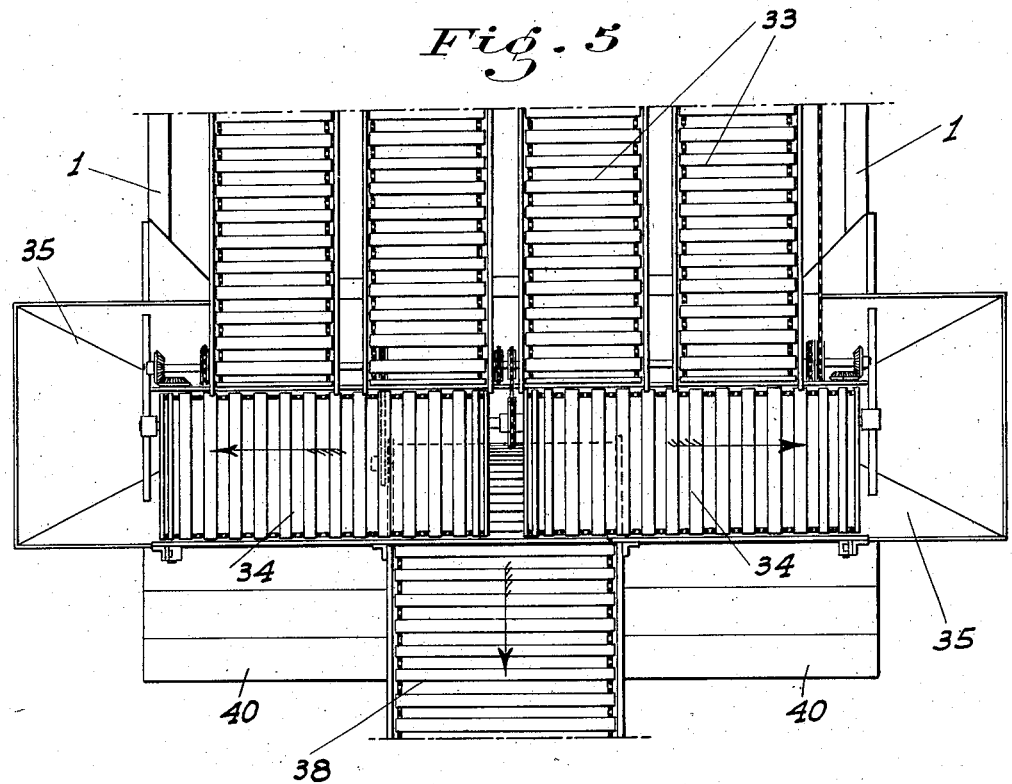
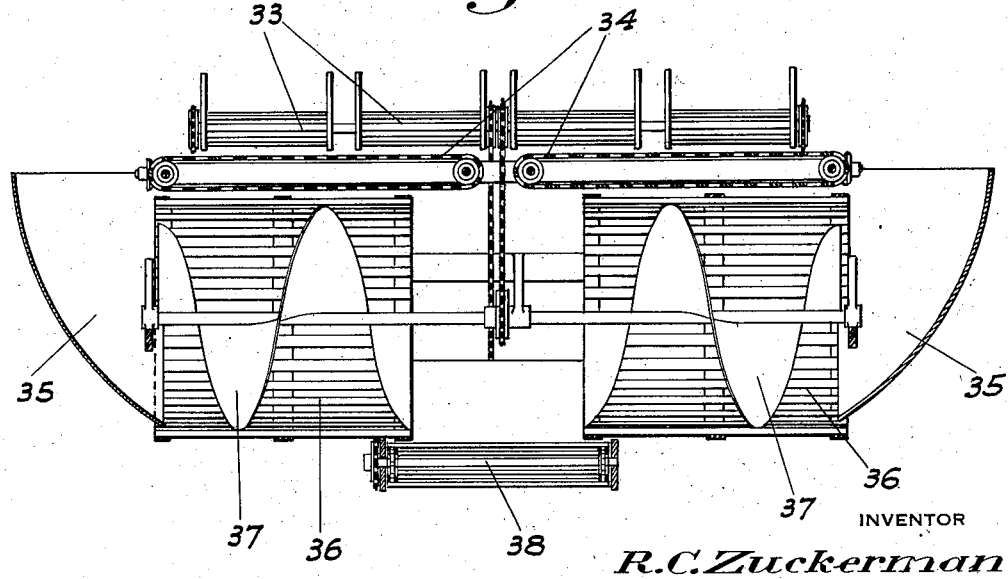
INVENTOR
R. C. Zuckerman
BY
ATTORNEY Patented Feb. 25, 1930

1,748,746

UNITED STATES PATENT OFFICE

ROSCOE C. ZUCKERMAN, OF STOCKTON, CALIFORNIA

BEET HARVESTER

Application filed December 14, 1929. Serial No. 414,084.

This invention relates to the sugar beet industry, and particularly to a machine for topping and digging the beets. In connection with beets of this character it is essential that they shall be topped before being delivered to the refining apparatus. It is also essential that the beets shall be topped at the proper height, since if too much of the body of the beet is removed with the crown and leaves a considerable loss is entailed in the aggregate, since the sugar content of the part removed cannot of course be saved. If, on the other hand, an insufficient portion of the crown is removed a part of the beet which has no sugar content and hence no value, and which adds to the bulk to be treated in the refinery to no useful purpose, is retained; thus of course cutting down the sugar output at the refinery relative to the total quantity of beets handled.

Automatically functioning topping devices, which aim to gage the level of cutting of the topping element by the aid of a guide shoe or the like to first engage the beet, have been tried out. Such devices however have proved unsatisfactory in practice, since it has been found impossible for devices of this character to act with the necessary speed and accuracy. Manually controlled topping units have also been previously suggested, to take the place of the automatic devices. In all such manually controlled devices, as far as I am aware, however, the operator has been positioned at such a distance from the topping unit itself that it is impossible for him to properly see the beets about to be topped and to accurately gage the level at which the cutting element should be disposed relative to the beet to obtain the best results.

It is therefore the principal aim of my invention to provide a manually controlled topping device mounted directly on a beet harvester, so arranged that the operator of the topping device is positioned so that he can readily see and closely gage the level of the cutting of the topping unit relative to the beet, thus removing the element of uncertainty present in the previous devices.

I have also provided an apparatus of this character in which a number of topping units, each adapted to top a single row of beets and controlled by a corresponding number of operators, are mounted in connection with a single digging and conveying mechanism. This enables a multiplicity of rows of beets to be all properly topped at the same time, and subsequently all dug up together with one machine and during a single movement of the same along the field.

I have also provided in connection with the different topping units, a means for engaging and conveying all the topped portions of the beets as they are severed and for delivering the same in a definite position to one side of the machine instead of leaving them scattered along the individual rows.

As a further object I have provided in connection with the main conveying apparatus of the harvester a means for causing any dirt adhering to the beets to be removed therefrom before the beets are finally discharged from the harvester onto the wagon which conveys them to the refinery. By this means the beets when thus delivered onto the wagon are free from practically all dirt and are in relatively clean condition, so that subsequent cleaning operations are considerably simplified.

These objects I accomplish by means of such structure and relative arrangement of parts as will fully appear by a perusal of the following specification and claims.

In the drawings similar characters of reference indicate corresponding parts in the several views:

Fig. 1 is a side elevation of the complete apparatus.

Fig. 2 is an enlarged fragmentary section of a cutting and top catching and conveying unit.

Fig. 3 is a front end view of a pair of such units.

Fig. 4 is a top plan view of the same.

Fig. 5 is a top plan view of the rear end beet conveying and cleaning structure.

Fig. 6 is a transverse section of the same.

Referring now more particularly to the characters of reference on the drawings, the machine comprises a main horizontal supporting frame 1 mounted toward its rear end on transversely spaced wheels or endless track units 2, and at its forward end on steerable wheels 3. The units 2 are driven by chain drives 4 or the like from a differential 5 mounted on the frame, which differential is driven through a transmission indicated at 6, from a gas engine or the like mounted on the frame structure and enclosed in the usual hood or housing 7.

Projecting forwardly from the main frame 1 and hinged thereon is a rigid auxiliary frame structure which includes longitudinally extending beams 8. These beams are normally held on the level but are adapted to be raised from such level at will by one or more cables 9 extending about a hand controlled drum and hoist device mounted on the frame 1, and indicated at 10. This auxiliary frame structure supports the manually controlled beet topping units and their operators; there being as many separate units, each adapted to top a single row of beets, mounted on the one frame as may be desired or found most practicable.

Each such unit is constructed and mounted as follows:

Depending from the beams 8 toward their rear ends and rigid therewith are transversely spaced uprights 11 to each of which is pivoted a pair of forwardly extending vertically spaced bars 12. The two adjacent pairs of such bars are pivoted at their forward ends onto and support vertical frame elements 13 from which vertically disposed and transversely extending housings 14 depend.

A control handle 15 is rigid with and projects forwardly from the housing; tension springs 16 between the housing and the fixed structure above and rearwardly of the same holding said housing normally suspended at a certain level and acting as a counterbalance.

Turnable in the housing in transversely spaced relation to each other relative to the transverse plane of the harvester are wheels or discs 17 about which an endless band saw 18 extends; the cutting edge of said saw facing forwardly. The housing completely surrounds the discs on both sides and also the upper run of the saw, but is cut out, both at front and back, between said discs from the bottom toward the top so as to leave a relatively large opening 19 therethrough, the lower run of the saw intermediate the discs being thus exposed.

Fixed at their front ends to the front of the housing to one side of said opening 19 are a number of vertically spaced transversely resilient deflector bars 20, projecting first ahead of the housing some distance and then at a transverse and upward angle rearwardly through the opening 19 to rearward terminations in overhanging relation to a cross draper 21 supported from the auxiliary frame structure as plainly shown in the drawings. This draper extends the full width of the machine or past all the different topping units, and is driven by any suitable means such as an electric motor 22 mounted in direct connection therewith so as to discharge all matter carried thereby to one side of the machine. Associated with the deflector bars to one side of the same is an endless chain 23 or the like, mounted on sprockets 23ª, fixed in connection with the housing 14 by a suitable bracket 24. The sprockets are set with their axes in transverse vertical planes so that the runs of the chain will be spaced transversely of each other, but parallel to the bars in a longitudinal direction; the run of the chain nearest the bars being somewhat close thereto. Rigid fingers 25 project outwardly from the chain at intervals, being positioned to project between adjacent bars.

Suitable driving means is provided for operating the saw and chain of each unit. In the present instance I have such means as constituting an electric motor 26 mounted on the housing 14 and directly connected to one of the discs 17; and another electric motor 27 mounted on the bracket 24 and connected to the rear sprocket 23ª of the chain by a suitable reduction drive such as a worm and wheel structure 28. The current for the motors is obtained from a generator 29 mounted on the frame 1 and driven from the gas engine thereon; the leads 30 from the generator to the motors being flexible where necessary to permit of the vertical movement of the auxiliary frame relative to the main frame and the independent vertical movement of the topping units relative to the auxiliary frame.

It will be observed that the bars 12 form a parallel motion support for the cutters, the deflector bars 20 and the endless chain 23 so that vertical adjustment of the cutters may be made while maintaining the cutters in constant parallelism to the ground and, at the same time, while maintaining the deflectors 20 and chains 23 in correct angular relation to the cutters.

As previously stated, there are a number of separate topping units on the one machine, which are spaced apart, as to their exposed saw portions, a distance equal to the standard spacing between adjacent rows of beets. In order to enable said saw portions to be thus exposed, without making the units so small as to be weak and unsubstantial, I arrange them in overlapping but not contacting relation at their adjacent ends, as shown in Figs. 3 and 4. To enable the different units to be individually controlled by separate operators I mount a continuous bench 31 or individual seats in front of said units and suspended from the beams 8; said bench or seats extending transversely of the machine and being positioned so that the workers occupying the same are seated in facing relation to the topping units, and so that they can conveniently reach and manipulate the various handles 15.

The operators are therefore facing away from the direction of movement of the machine, or in other words are sitting backwards, but this is no disadvantage as far as the efficiency of their control of the topping units is concerned, but rather the reverse. This is because the operators can thus be located so close to the units and the saws that they can very readily see the saws and accurately gage the cutting levels of the same relative to the beets to be topped. This would be impossible if the operators were located behind the units and facing forwardly of the machine, since the necessary conveying and discharging apparatus disposed rearwardly of the topping units would of course be in the way of their proper and close vision of the saws and beets.

In operation therefore with the advance of the machine along the ground, and with the various moving parts of the topping units in operation, the different controlling operators of said units seated on the bench manipulate said units up or down as may be necessary to position the respective saws so as to cut through the tops of the beets at just the right height, as their judgment and experience determines. A beet top as being severed passes between the bars 20 and the corresponding chain 23, which, being somewhat close to the bars, causes the leaf portion of the top to be squeezed and held between said bars and chain so that the top will not drop, the bars yielding laterally if necessary to accommodate the top. A finger 25 of the chain then engages and forces the top rearwardly until the same is permitted to drop onto the draper 21 by reason of the divergence of the chain and bars at their rear ends. The draper conveys the tops deposited thereon to one side of the machine where all the tops are discharged onto the ground in the form of a single windrow which extends along the path of movement of the machine.

The topped beets temporarily remain in the ground, but with the continued forward movement of the machine they are dug by a blade 32, common to all the rows topped, and delivered from said blade onto conveyors 33 mounted in unitary association therewith. This conveying and digging unit is mounted in connection with the frame 1; the conveyors extending upwardly and rearwardly from the blade to a rearward termination above and at the rear end of the frame 1. These conveyors discharge onto a pair of transversely extending horizontal drapers 34 supported from the frame 1 at its rear end and driven in opposite directions so that said drapers discharge at their outer or opposite ends. The drapers deliver into hoppers 35 which feed into the outer ends of transversely extending and spaced drums 36, which are formed of slats or are otherwise of a foraminous nature so that dirt may drop therethrough while the beets will be retained therein. The drums are rotated by any suitable driving connections from the power plant of the harvester and have oppositely disposed auger conveyors 37 therein arranged to cause the beets to travel lengthwise through the drums toward their adjacent ends, from which they pass onto an upwardly and rearwardly extending conveyor 38 mounted in connection with the harvester and drums. This conveyor 38 is adapted to deliver into a wagon 39 disposed behind the harvester and releasably coupled thereto, as shown in Fig. 1.

Between the time the beets are dug and delivered into the wagon therefore they are subjected to a tumbling action in the drums, which effectually removes all dirt which may cling to the same so that the beets when finally deposited in the wagon are in a clean condition for delivery to the refinery. If desired, platforms 40 may be mounted on the machine behind the drums or otherwise adjacent the drapers 34, so that an inspector may if necessary travel with the machine and inspect the beets as they are delivered onto the drapers, so that he may see whether they are being properly topped, and may also of course judge the general condition of the beets.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Attention is directed to my copending application for patent, Ser. No. 413,814, filed Dec. 13, 1929.

Having thus described my invention what I claim as new and useful and desire to secure by Letters Patent is:

1. In a vegetable harvester having a wheel supported frame adapted to travel along the ground, a vertically movable topping unit mounted in connection with said frame, manually operated means for thus moving said unit, and a support for the operator of said means mounted in close association with the unit.

2. In a vegetable harvester having a wheel supported frame adapted to travel along the ground, a vertically movable topping unit mounted in connection with said frame, a rigid handle projecting forwardly from said unit relative to the direction of advancing movement of the harvester, and a seat for the operator supported from the harvester ahead of the handle whereby the operator will face rearwardly of said direction of advancement.

3. In a vegetable harvester having a wheel supported frame adapted to travel along the ground, a vertically movable topping unit mounted in connection with said frame, manually operated means for thus moving said unit, and a seat for the operator of said means mounted in connection with the harvester adjacent the unit and relatively close to the ground.

4. In a vegetable harvester, a topping unit including a horizontal cutting blade positioned to extend transversely of the direction of movement of the harvester, power means mounted directly on the unit for independently driving the blade, and means supporting said blade for vertical movement relative to the ground.

5. In a beet harvester, a beet topping unit including a horizontal cutting element to successively engage and cut the tops off a row of beets with the advancing movement of the harvester, means for moving the unit up and down at will for controlling the level of the cutting element, said means being arranged to maintain the cutting element parallel to the ground in all positions; a draper behind the unit separate therefrom and mounted in a relatively fixed position, and means fixed on the unit, to move vertically in fixed angular relation therewith, for engaging the tops of the beets as they are severed and conveying them to the draper.

6. In a beet harvester, a beet topper unit including a horizontal cutting element to successively engage and cut the tops off a row of beets with the advancing movement of the harvester, a draper at the rear of the cutting element and spaced therefrom, vertically spaced resilient deflector bars mounted in connection with the unit above the cutting element and extending from ahead of the element to a rearward termination in overhanging relation to the draper, conveyor means associated with the bars for holding a beet top, as it is severed against the bars and for causing said top to be moved along the bars until the rear end of the latter is reached and parallel motion means for adjustably supporting the cutting element, the deflector bars and conveyor to permit vertical adjustment thereof while maintaining their angular interrelation and the parallelism of the cutting means to the ground.

7. A vegetable harvester including a vehicle, a topping mechanism carried by the vehicle, and an operator's seat supported by the vehicle close to the ground and positioned to permit the operator to closely observe the approach of the topping mechanism to the vegetables to be topped.

8. A vegetable topping harvester including a topping mechanism, and an operator's seat adjacent the topping mechanism and positioned to permit the operator to closely observe the approach of the topping mechanism to the vegetables to be topped.

9. A vegetable topping harvester including a topping mechanism adjustable for height, and an operator's seat adjacent the topping mechanism and positioned to permit the operator to closely observe the approach of the topping mechanism to the vegetables to be topped, said topping mechanism including means to be controlled by the operator in said seat for effecting adjustment for height.

10. A vegetable topping harvester including a topping mechanism adjustable for height, an operator's seat adjacent the topping mechanism and positioned to permit the operator to closely observe the approach of the topping mechanism to the vegetables to be topped, said topping mechanism including means to be controlled by the operator in said seat for effecting adjustment for height, and springs urging said topping mechanism upwardly.

11. A vegetable topping harvester including a topping mechanism adjustable for height, and an operator's seat adjacent the topping mechanism in advance thereof and positioned to permit the operator to closely observe the approach of the topping mechanism to the vegetables to be topped, said topping mechanism including means to be controlled by the operator in said seat for effecting adjustment for height.

12. A vegetable topping harvester including a topping mechanism adjustable for height, and an operator's seat adjacent the topping mechanism and facing the same close to the ground to permit the operator to closely observe the approach of the topping mechanism to the vegetables to be topped, said topping mechanism including means to be controlled by the operator in said seat for effecting adjustment for height.

13. A vegetable harvester including a vehicle, a top cutting mechanism suspended from the vehicle frame, an operator's seat supported by the vehicle and extending to a point closely adjacent the ground and in proximity to the cutting mechanism to permit the operator to closely observe the approach of the cutting mechanism to the vegetables to be topped and to accurately gage the point of contact of the cutter with the vegetables.

14. In a vegetable harvester, a main vehicle, a suspended frame projecting forwardly of and supported on the main vehicle, a seat carried by the suspended frame closely adjacent the ground, and a topping means controllable by an occupant of the seat.

In testimony whereof I affix my signature.

ROSCOE C. ZUCKERMAN.